Nov. 24, 1953       D. C. SHELTON       2,660,060
MILK BOTTLE THERMOMETER SUPPORT
Filed April 5, 1949
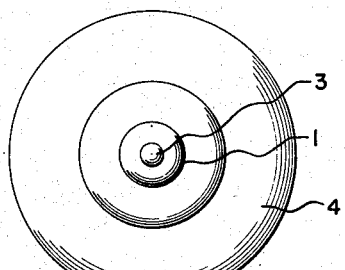
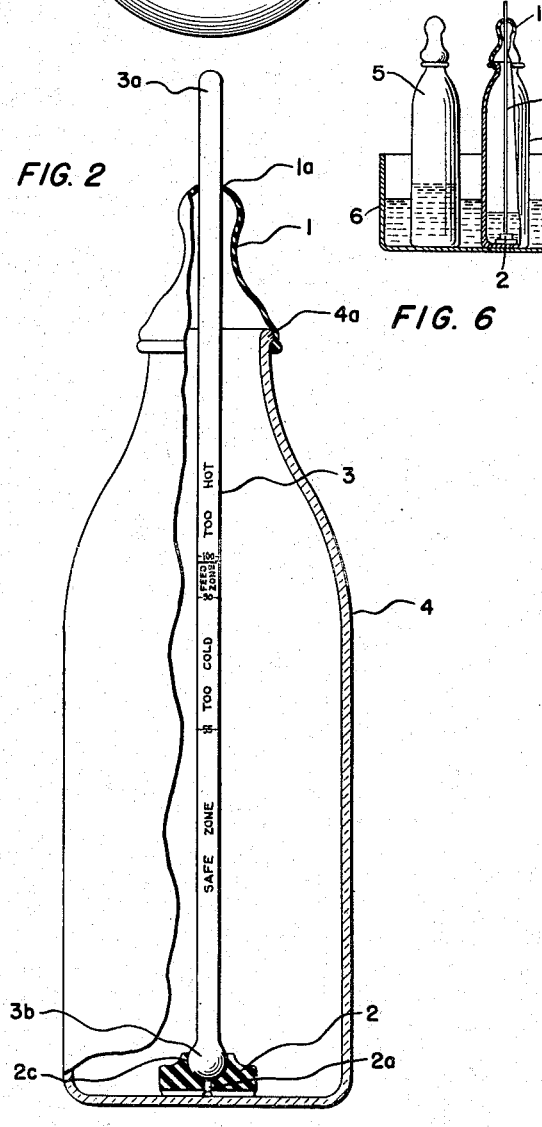
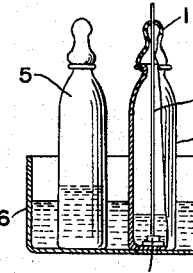
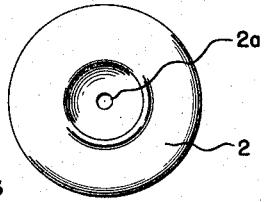
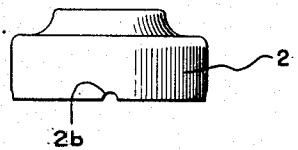
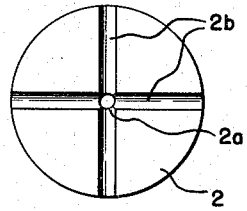
INVENTOR.
DONALD C. SHELTON
BY
AGENT Patented Nov. 24, 1953

2,660,060

UNITED STATES PATENT OFFICE 2,660,060

MILK BOTTLE THERMOMETER SUPPORT

Donald C. Shelton, San Diego, Calif.

Application April 5, 1949, Serial No. 85,544

2 Claims. (Cl. 73—343)

My invention relates to a milk bottle thermometer support, more particularly to an improvement over my former patent application, Serial No. 675,682, filed June 10, 1946, for Temperature Indicating Device for Baby Feeding, now abandoned, and the objects of my invention are:

First, to provide a thermometer support for use in connection with conventional baby milk feeding bottles, so that a thermometer may be supported in such a bottle adjacent to a similar bottle full of milk for indicating the rise in temperature in the milk during heating of the same, so that milk, when fed to the baby, may be at the proper temperature;

Second, to provide a thermometer support of this class which is particularly adapted for use in connection with a large variety of differently constructed bottles for supporting a thermometer therein;

Third, to provide a thermometer support of this class which is resilient and effectively prevents damage of a thermometer in a bottle during various handling operations;

Fourth, to provide a thermometer support of this class which is adapted to promote accurate thermally responsive action of the thermometer in the bottle in accordance with the rise in temperature of the liquid in the bottle surrounding the thermometer;

Fifth, to provide a thermometer support of this class which may be constructed partially of various milk feeding nipples now on the market and used in connection with bottles of varying construction;

Sixth, to provide a novel support for thermometers of this class; and

Seventh, to provide a milk bottle thermometer support of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a top or plan view of my milk bottle thermometer support; Fig. 2 is a side elevational view thereof showing the same in connection with a thermometer and a conventional baby milk feeding bottle; Fig. 3 is a top or plan view of the thermometer base supporting portion of my thermometer support, showing the same on enlarged scale; Fig. 4 is a side elevational view thereof; and Fig. 5 is a bottom plan view thereof; Fig. 6 is an end elevational view of a water pan having two bottles therein.

Similar characters of reference refer to similar parts and portions throughout the several views of the drawing.

The thermometer body support 1 and the base support 2 constitute the principal parts and portions of my milk bottle thermometer support.

In the construction of my milk bottle thermometer support, I have provided a resilient grommet-like member 1, which serves as the thermometer body support, and this resilient grommet-like thermometer body support 1 may be made of a conventional feeding nipple by providing an opening 1a in the extending end thereof, through which the body portion 3a of the thermometer 3 may be extended. It will be noted that when such conventional nipples are used, that they readily engage the conventional bottle neck 4a of the particular bottle 4 for which they were designed. Special grommets may be made for supporting the body of the thermometer 3 which would serve as the thermometer body support 1, and it is obvious to anyone skilled in the art that a disc-shaped structure having an opening therein, and engaged with the neck of a bottle, would be an equivalent to the disclosure of the thermometer body support 1 in Fig. 2 of the drawings.

The thermometer 3 is a conventional temperature thermometer having graduations thereon indicating normal body temperature, at which milk should be heated to properly feed an infant. Other graduations on the thermometer indicate low temperatures and high temperatures below and above the normal body temperature.

The bulb 3b of the thermometer 3 is supported in a resilient or soft base support 2, preferably made of rubber or the like, which is a disc-shaped member having a central opening 2a therein, and radially communicating passages 2b which extend to the periphery of the base 2 for circulation of the water around the bulb 3b of the thermometer 3, insuring uniform thermal response of the thermometer to rise in temperature of the water in the bottle 4 when heated externally. The base support 2 is provided with a socket portion 2c substantially deeper than a hemisphere, so that it is provided with a substantial gripping bearing for engagement with the bulb 3b of the thermometer 3, so that it does not become displaced from the end of the thermometer 3, whereby breakage of the bulb 3b of the thermometer 3 is insured against. The resilient support of the body of the thermometer in the thermometer body support 1 prevents the body of the thermometer from being broken against the side or inner portion of the neck of the bottle 4.

Inasmuch as the bottle 4 is transparent, a view through the side wall thereof may be taken of the thermometer 3 periodically during the rise in temperature of the liquid in the bottle 4, so that a corresponding bottle 5 full of milk in the same heating container 6 maintaining fluid externally of the bottles 4 and 5 will enjoy a corresponding rise of temperature to that indicated by the thermometer 3, so that the milk may be readily removed from the heating container when the temperature indicated by the thermometer 3 is substantially at the body temperature of a human infant.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a milk bottle thermometer support of the class described, an infant feeding milk bottle, a thermometer body support engaging the neck of said bottle and having an opening therethrough, a thermometer extending through the opening in said thermometer body support and downwardly into said milk bottle, a base support for said thermometer, said base support having a portion fitted over the end of said thermometer and frictionally gripping the same, said support having passages therein communicating with the end of said thermometer and the interior of said bottle.

2. Apparatus for determining the temperature of infant's milk in a bottle being heated in a pan of water, comprising a water bottle in the form of an infant's feeding bottle having a neck and a body portion, a thermometer body support consisting of a milk bottle nipple of highly resilient material secured on said neck and having an opening in the outer end thereof, a thermometer extending through said opening and downwardly into said body portion, a base support for said thermometer, said base support having a portion fitted over one end of said thermometer and frictionally gripping the same, said base support having passages therein communicating with said end of the thermometer and the interior of said body portion.

DONALD C. SHELTON.

References Cited in the file of this patent

UNITED STATES PATENTS

| Number | Name | Date |
|---|---|---|
| 1,828,628 | Torgerson | Oct. 20, 1931 |
| 2,084,875 | Thoren | June 22, 1937 |

FOREIGN PATENTS

| Number | Country | Date |
|---|---|---|
| 7150('93) | Great Britain | Feb. 10, 1894 |
| 6040('08) | Great Britain | Feb. 11, 1909 |